(12) United States Patent  
Schnee

(10) Patent No.: US 8,247,014 B2
(45) Date of Patent: Aug. 21, 2012

(54) APPARATUS AND METHOD FOR APPLYING FONDANT TO CONFECTIONS

(76) Inventor: Christine Marie Schnee, Easley, SC (US)

( * ) Notice: Subject to any disclaimer, the term of this patent is extended or adjusted under 35 U.S.C. 154(b) by 192 days.

(21) Appl. No.: 12/456,983

(22) Filed: Jun. 24, 2009

(65) Prior Publication Data

US 2010/0330258 A1    Dec. 30, 2010

(51) Int. Cl.
*A23G 3/20* (2006.01)
*A23G 3/54* (2006.01)

(52) U.S. Cl. ........ 426/512; 426/289; 426/302; 156/238; 156/251; 156/361; 156/521; 156/577; 242/128; 242/129

(58) Field of Classification Search ............ 426/302, 426/512; 156/238, 251, 361, 521, 522, 577; 242/128, 129; 53/137, 219; 4/302, 512
See application file for complete search history.

(56) References Cited

U.S. PATENT DOCUMENTS

| | | | | |
|---|---|---|---|---|
| 1,929,894 A | * | 10/1933 | Lutz | 242/578.1 |
| 2,249,680 A | * | 7/1941 | Bishop | 242/141 |
| 2,549,136 A | * | 4/1951 | Simpson et al. | 53/137.2 |
| 3,310,452 A | * | 3/1967 | Hartley et al. | 156/523 |
| 3,567,557 A | * | 3/1971 | Kingery et al. | 156/523 |
| 3,586,252 A | * | 6/1971 | Sutton | 242/560.2 |
| 3,900,362 A | * | 8/1975 | Schaffer | 156/577 |
| 4,487,376 A | * | 12/1984 | Compton | 242/423.1 |
| 4,714,211 A | * | 12/1987 | Hwang | 242/423.1 |
| 4,720,053 A | * | 1/1988 | Vance | 242/423.2 |
| 4,792,102 A | * | 12/1988 | Olson | 242/423.2 |
| 6,047,920 A | * | 4/2000 | Dearwester et al. | 242/594.5 |
| 6,173,749 B1 | * | 1/2001 | Johnson | 156/574 |

\* cited by examiner

*Primary Examiner* — D. Lawrence Tarazano
*Assistant Examiner* — Assaf Zilbering
(74) *Attorney, Agent, or Firm* — Thomas L. Moses; Monahan & Moses, LLC

(57) ABSTRACT

A fondant rolling device comprises three main parts: an axle member, a roller member, and a base member. Fondant is rolled onto the roller member, and the applied to the confection by unrolling the fondant therefrom. As the fondant is unrolled from the roller member and the fondant roller becomes smaller, the axle slides from a central portion of the base toward an outer periphery of the base, so that the fondant may be applied to the confection without interference from the base member.

8 Claims, 2 Drawing Sheets

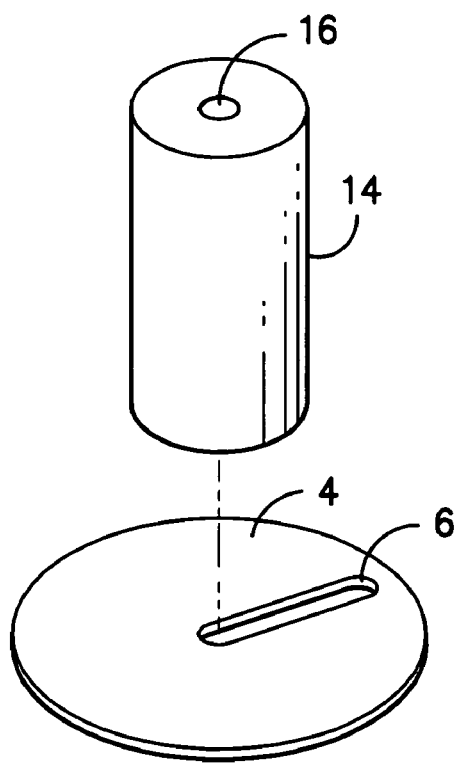
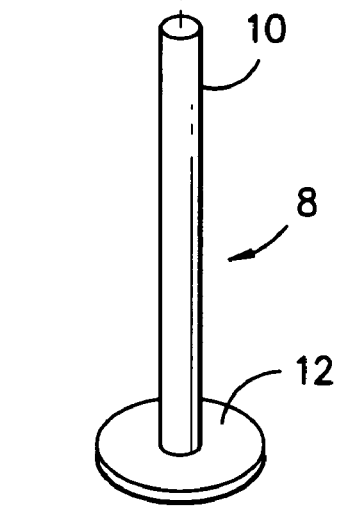
FIG. -1-
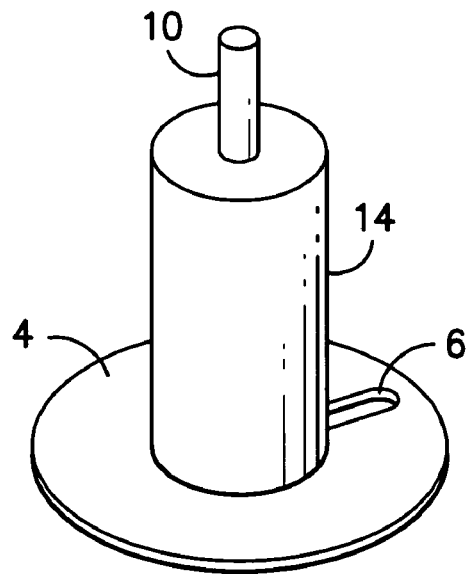
FIG. -2A-
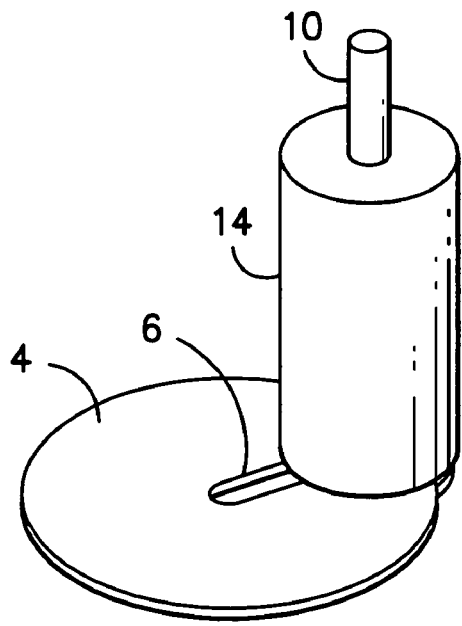
FIG. -2B-

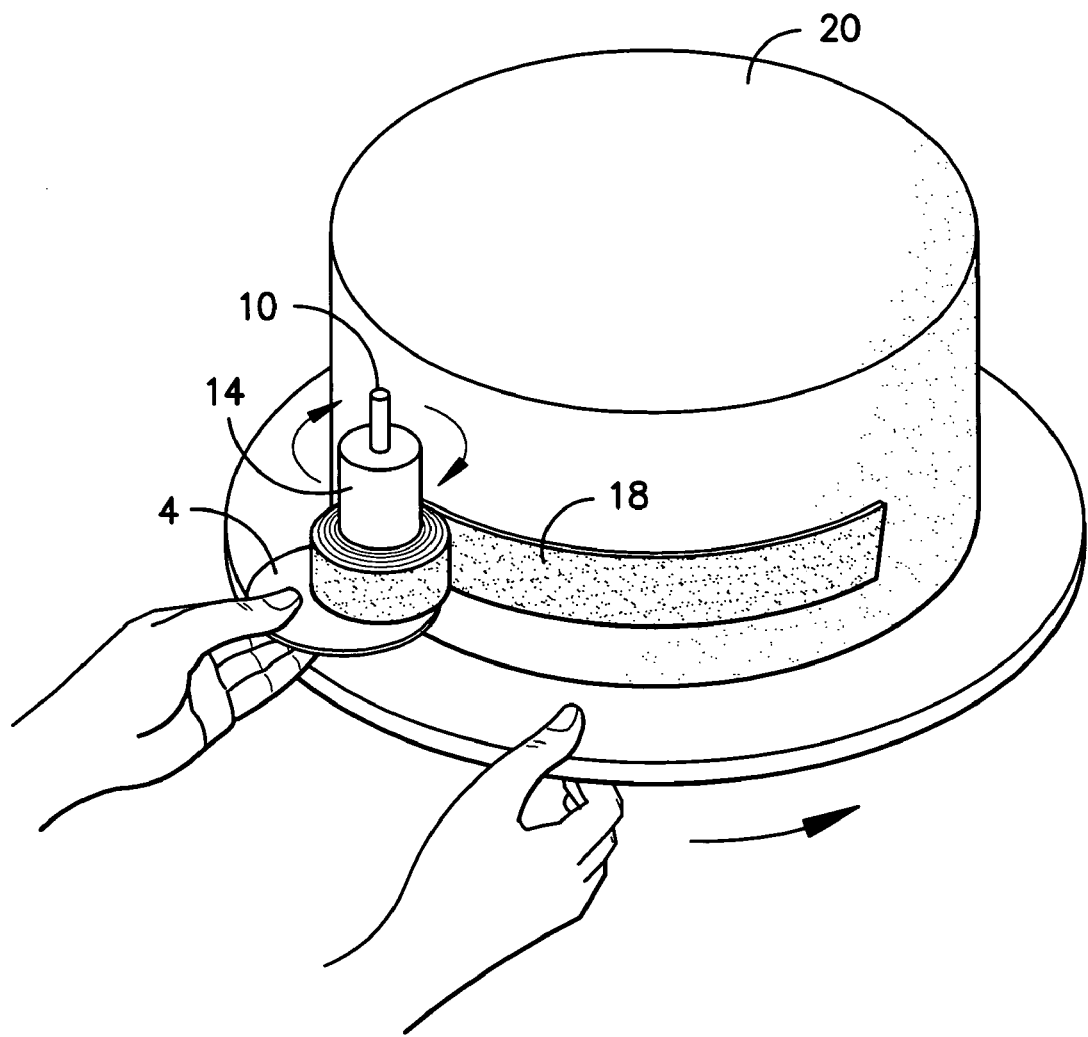
FIG. -3-

APPARATUS AND METHOD FOR APPLYING FONDANT TO CONFECTIONS

BACKGROUND OF THE INVENTION

The present invention relates generally to an apparatus and method for applying fondant to confections. More specifically, the present invention includes a device for applying a rolled strip of fondant to a confection such as a cake, and a method for such application.

Cake decorators often fashion fondant into strips, and then apply the strips to cakes in various configurations. Sometimes the fondant ribbon is applied about the sides of the cake in a straight line, or as close to a straight line as a cake decorator can manage. Oftentimes, applying a ribbon of fondant to the side of a cake in this manner requires two people: one person to hold the loose end of the fondant ribbon, trying to ensure that the fondant ribbon does not tear or stretch in the process, and a second person to apply the fondant ribbon to the sides of the cake. Additionally, it is difficult to apply the fondant ribbon in a straight line when desired, because the person applying the fondant ribbon is also supporting a portion of the ribbon that has not yet been applied.

It would be desirable, therefore, to provide an apparatus that would allow a fondant ribbon to be applied to a cake or other confection, where a single decorator could perform the task alone, and which would result in a straight line and professional appearance. It would further be desirable to provide a method for applying a fondant ribbon (or other decorative, edible item having a ribbon shape) to a confection in a manner that is easier than application by hand.

BRIEF SUMMARY OF THE INVENTION

In accordance with one aspect of the invention, a fondant rolling device comprises three main parts: an axle member, a roller member, and a base member. The base member, in a preferred embodiment, is circular and flat, and includes a generally straight opening or slit positioned so that one end of the slit is approximately at the center of the circular base member, and the slit extends radially toward an outer periphery of the base member. The axle member is a straight, cylindrical rod having a head portion on one end that is preferably flat and circular. The rod of the axle slides upwardly through the slit in the base member until the head portion of the axle member comes into contact with the bottom side of the base. The roller member is cylindrical in shape, and includes a longitudinal axial hole through which the axle rod may pass, so that the roller member may rotate about the axle.

In use, a strip of fondant is rolled onto the roll member, which is then assembled onto the fondant roll as set forth above. Then, the cake decorator may position the apparatus adjacent the cake or confection, and begin to apply the ribbon to the outside of the cake. The fondant ribbon simply unrolls from the roll as it is applied to the side of the cake. As the fondant ribbon unrolls, and the roll becomes smaller, the axle (and thus axis of the roller) gradually shifts from a more central position within the slit in the base member toward an outer periphery, so that the outer layer of fondant on the roll may be rolled directly onto the cake without interference from the base member. This arrangement allows a single person to apply the fondant ribbon to the cake in a straight line, without the necessity of having another person attempt to support the free end of the fondant ribbon during the application process.

It should be noted that the present device may also be used to apply other types of ribbons to confections, including ribbons made from fabric.

BRIEF DESCRIPTION OF THE DRAWINGS

These and other features, aspects, and advantages of the present invention will become better understood with regard to the following description, appended claims, and accompanying drawings where:

FIG. 1 is an exploded view of one embodiment of the fondant roller, showing the axle member, the base member and the roller member;

FIG. 2A is a perspective view of one embodiment of the fondant roller in its assembled state, with the axle member disposed in a central portion of the opening in the base member;

FIG. 2B is a perspective view of the embodiment of the fondant roller shown in FIG. 2A, with the axle member disposed in a position within the opening in the base member near the periphery of the base member; and FIG. 3 is a perspective view of one embodiment of the fondant roller in use with a roll of fondant positioned on the roller member, and being applied to a confection.

DETAILED DESCRIPTION OF THE INVENTION

A first embodiment of the present invention is shown in FIGS. 1-3. A generally flat base member 4, preferably circular in shape, includes a substantially straight slit 6 extending from a central point on the base radially toward an outer periphery of the base. An axle member 8 includes a round rod or shaft 10 and a head portion 12, which is formed into a circular shape in a preferred embodiment, but could have any desired shape. The axle rod 10 slides upwardly through the slit 6 in the base 4 until the head portion 12 of the axle member 8 comes into contact with the bottom of the base 4. A roller member 14 has a cylindrical shape and a hole 16 extending through its axis, so that the roller member 14 can slide downwardly onto the axle rod 10. The axle rod 10, in a preferred embodiment, extends past the top of the roller member 14, so that a user may grip and hold the top of the axle rod 10 while the apparatus is in use.

In a preferred embodiment, the components may be made from stainless steel or plastic, preferably ultra high molecular weight (UHMW) polypropylene, high density polyethylene (HDPE), nylon, or Delrin, which is polyoxymethylene. Using such material to form the components prevents the components from corroding or rusting, allows components to be easily cleaned, and ensures that the components may withstand the rigorous cleaning action and high temperatures of residential and commercial dishwashing machines. These materials are stain resistant, FDA approved, and generally will not break under normal use. While preferred materials may be used, it is contemplated that other materials may be used to form the components, as well.

In order to use the fondant roller to apply a fondant ribbon 18 to a confection 20, the fondant ribbon 18 is formed. In one embodiment, fondant is flattened with a roller or some other flattening device until it has a generally uniform thickness. Then the fondant is either cut using a knife or other sharp implement, or a shaped cutter may be used, similar to a cookie cutter. Next the fondant ribbon 18 is rolled onto the roller member 14, which is then placed onto the apparatus by sliding the roller member 14 onto the axle rod 10, which is engaged through the slit 6 in the base member 4, as shown. The user may grip the top of the axle rod 10 with one hand to position the apparatus next to the cake or confection 20, and may apply the fondant ribbon 18 to the cake 20 with the other hand by unrolling the fondant ribbon 18 from the roll member 14. The user moves the apparatus along the side of the cake 20 so that the fondant ribbon 18 rolls off of the roller member 14 and onto the side of the cake 20. As the fondant ribbon 18 is applied, and the fondant ribbon roll becomes smaller, the axle rod 10 slides toward the outer periphery of the base member 4 so that the fondant 18 can directly contact the cake 20 as it is being unrolled, without interference from the edge of the base member 4, as shown in FIG. 3.

This arrangement allows a single person to apply a fondant ribbon 18 to a cake 20 or the like, in a straight line, without having to use another person to support the fondant ribbon 18 during the application process. Further, this method allows the fondant 18 to be applied to the cake 20 without stretching or tearing the fondant ribbon 18. It should be understood that the instant device may be used to apply other types of ribbons to cakes and confections, including ribbon made from fabric.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An apparatus for applying fondant to a confection, said apparatus comprising:
   a substantially flat base member having a slit defined therein, wherein said slit extends from a central portion of said base member in a substantially straight line toward a periphery thereof;
   an axle member including a rod and a head portion, said rod portion adapted to slide through said slit in said base member upwardly until said head portion abuts a bottom side of said base member;
   said apparatus has a single roller member in which said roller is carried on said base member and has a cylindrical shape with a longitudinal hole extending axially through said single roller member so that said rod portion of said axle member may be placed through said longitudinal hole of said single roller member; and
   a strip of fondant disposed about said single roller member, so that said strip of fondant may be dispensed from said single roller member directly onto a confection.

2. The apparatus set forth in claim 1, wherein said base member is substantially circular in shape.

3. The apparatus set forth in claim 1 wherein the length of said rod portion of said axle is greater than the longitudinal length of said roller member.

4. The apparatus set forth in claim 1, wherein said head portion of said axle member is substantially circular in shape.

5. A method for using the apparatus of claim 1, said method comprising the step of:
   applying said fondant to a confection by unrolling said fondant from said roller member and applying it to said confection.

6. The method set forth in claim 5, wherein said base, axle and roller member may be disassembled into separate components.

7. The method set forth in claim 5, including the step of shaping said fondant into a rectangular shape prior to applying said fondant to said confection.

8. The method set forth in claim 5, wherein said base member is substantially flat and substantially circular in shape.

* * * * *